United States Patent
Muramatsu et al.

(10) Patent No.: US 9,734,581 B2
(45) Date of Patent: Aug. 15, 2017

(54) ON-VEHICLE CONTROL DEVICE

(71) Applicant: Clarion Co., Ltd., Saitama-shi, Saitama (JP)

(72) Inventors: Shoji Muramatsu, Tokyo (JP); Akira Utagawa, Tokyo (JP); Takehito Ogata, Tokyo (JP); Satoshi Suzuki, Yokohama (JP)

(73) Assignee: Clarion Co., Ltd., Saitama-shi (JP)

( * ) Notice: Subject to any disclaimer, the term of this patent is extended or adjusted under 35 U.S.C. 154(b) by 156 days.

(21) Appl. No.: 14/647,294

(22) PCT Filed: Nov. 21, 2013

(86) PCT No.: PCT/JP2013/081426
§ 371 (c)(1),
(2) Date: May 26, 2015

(87) PCT Pub. No.: WO2014/084121
PCT Pub. Date: Jun. 5, 2014

(65) Prior Publication Data
US 2015/0302574 A1    Oct. 22, 2015

(30) Foreign Application Priority Data
Nov. 27, 2012    (JP) ................................. 2012-259062

(51) Int. Cl.
*G06T 7/00* (2017.01)
*B62D 15/02* (2006.01)
(Continued)

(52) U.S. Cl.
CPC .......... *G06T 7/004* (2013.01); *B62D 15/0275* (2013.01); *G06T 7/70* (2017.01); *G06T 2207/30256* (2013.01)

(58) Field of Classification Search
CPC . G06T 7/004; G06T 7/70; G06T 2207/30256; B62D 15/0275
See application file for complete search history.

(56) References Cited

U.S. PATENT DOCUMENTS

2002/0027503 A1 *   3/2002   Higuchi ............... G05D 1/0246
                                                340/436
2009/0028388 A1 *   1/2009   Amagasaki ........ G06K 9/00805
                                                382/104
(Continued)

FOREIGN PATENT DOCUMENTS

JP      4-167007 A     6/1992
JP      2002-94978 A   3/2002
(Continued)

OTHER PUBLICATIONS

European Search Report issued in counterpart European Application No. 13857769.7 dated Jan. 26, 2016 (seven (7) pages).
(Continued)

*Primary Examiner* — Sath V Perungavoor
*Assistant Examiner* — Howard D Brown, Jr.
(74) *Attorney, Agent, or Firm* — Crowell & Moring LLP

(57) ABSTRACT

An on-vehicle control device includes: an image acquiring unit that acquires an image from an image-capturing device that captures the image of surroundings of a vehicle; an overhead view image generating unit that generates an overhead view image from the image acquired by the image acquiring unit, the overhead view image being a plan view of the surroundings of the vehicle seen from above the vehicle; a white line recognizing unit that recognizes possible white lines on a road surface in the overhead view image; a white line information saving unit that saves information including positional information of the possible white lines recognized by the white line recognizing unit; a white line position predicting unit that predicts a position of
(Continued)

a possible white line to be reached, based on information about a previous possible white line saved by the white line information saving unit and vehicle behavior information; and a white line judging unit that excludes, among the possible white lines recognized by the white line recognizing unit, a possible white line that extends in a radial direction from the image-capturing device in the overhead view image and satisfies a predetermined condition.

4 Claims, 12 Drawing Sheets

(51) Int. Cl.
    *G06T 7/70*     (2017.01)
    *G06K 9/00*     (2006.01)

(56) References Cited

U.S. PATENT DOCUMENTS

| | | | | |
|---|---|---|---|---|
| 2010/0002911 A1* | 1/2010 | Wu | ............ | G06K 9/00798 382/104 |
| 2010/0188200 A1* | 7/2010 | Hashimoto | ............ | B62D 15/029 340/435 |
| 2010/0208071 A1 | 8/2010 | Takahashi | | |
| 2010/0228426 A1* | 9/2010 | Suzuki | ............ | B62D 15/0275 701/31.4 |
| 2010/0259617 A1* | 10/2010 | Kawasaki | ............ | G06K 9/00798 348/148 |
| 2010/0284569 A1* | 11/2010 | Sakurai | ............ | G06T 3/00 382/103 |
| 2011/0310245 A1* | 12/2011 | Tsuchiya | ............ | G01S 11/12 348/135 |
| 2012/0265431 A1* | 10/2012 | Hayakawa | ............ | B60T 7/22 701/301 |
| 2013/0120125 A1* | 5/2013 | Wu | ............ | G06K 9/00798 340/439 |

FOREIGN PATENT DOCUMENTS

| | | |
|---|---|---|
| JP | 2002-109549 A | 4/2002 |
| JP | 2004-240636 A | 8/2004 |
| JP | 2005-335573 A | 12/2005 |
| JP | 2009-9331 A | 1/2009 |
| JP | 2009-83735 A | 4/2009 |
| JP | 2012-3662 A | 1/2012 |
| JP | 2012-166705 A | 9/2012 |
| WO | WO 2008/020544 A1 | 2/2008 |
| WO | WO 2009/044513 A1 | 4/2009 |

OTHER PUBLICATIONS

International Search Report (PCT/ISA/210) dated Jan. 21, 2014, with English translation (Three (3) pages).

Japanese Office Action issued in counterpart Japanese Application No. 2012-259062 dated Jan. 4, 2017 with English translation (10 pages).

Otsuka et al., "Vehicle Detection Technology Using Method of Feature Space Projection of Edge Pair", Japan Society for Precision Engineering, Dec. 8, 2005, and pp. 160-165 with partial translation.

* cited by examiner

BEYOND ON THRESHOLD   ADHESION JUDGMENT OFF → ADHESION JUDGMENT ON
BELOW OFF THRESHOLD   ADHESION JUDGMENT ON → ADHESION JUDGMENT OFF (a)          (b)

IN THE CASE OF WHITE LINE DRAWN ON ROAD SURFACE (a) T SECONDS     (b) T+1 SECONDS

IN THE CASE OF WATER DROP ON LENS DETECTED AS WHITE LINE (c) T SECONDS     (d) T+1 SECONDS

ON-VEHICLE CONTROL DEVICE

TECHNICAL FIELD

The present invention relates to an on-vehicle control device that is mounted on a vehicle and properly recognizes white lines in the surroundings of the vehicle.

BACKGROUND ART

Conventionally, a technology is known in which white lines of traffic lanes or parking frames are recognized by utilizing images captured by an image-capturing device (camera) mounted on a vehicle, so that the result of recognizing these white lines is utilized for driving control or parking assistance of the vehicle. In such a technology, it is necessary to accurately recognize the white lines of traffic lanes or parking frames. It is also known that collapse or falling down of three-dimensional objects occurs, when the captured images are transformed into an overhead view image (bird's-eye view image) (PTL 1).

CITATION LIST

Patent Literature

PTL1: Japanese Laid-Open Patent Publication No. 2012-3662

SUMMARY OF INVENTION

Technical Problem

In recognition of white lines of traffic lanes or parking frames by use of an overhead view image, collapsed images of three-dimensional objects can be erroneously recognized as white lines. Furthermore, it is also known that images that is not images of true white lines can be erroneously recognized as white lines, due to the effect of raindrops adhered to a lens of an image-capturing device (camera). There is a need to properly exclude these false white line images in white line recognition.

Solution to Problem

According to the 1st aspect of the present invention, an on-vehicle control device comprises: an image acquiring unit that acquires an image from an image-capturing device that captures the image of surroundings of a vehicle; an overhead view image generating unit that generates an overhead view image from the image acquired by the image acquiring unit, the overhead view image being a plan view of the surroundings of the vehicle seen from above the vehicle; a white line recognizing unit that recognizes possible white lines on a road surface in the overhead view image; a white line information saving unit that saves information including positional information of the possible white lines recognized by the white line recognizing unit; a white line position predicting unit that predicts a position of a possible white line to be reached, based on information about a previous possible white line saved by the white line information saving unit and vehicle behavior information; and a white line judging unit that excludes, among the possible white lines recognized by the white line recognizing unit, a possible white line that extends in a radial direction from the image-capturing device in the overhead view image and satisfies a predetermined condition.

According to the 2nd aspect of the present invention, in the on-vehicle control device according to the 1st aspect, it is preferred that the predetermined condition is at least one of a condition in which a possible white line is at the same position as the previous possible white line saved by the white line information saving unit and a condition in which a position of a possible white line deviates by a predetermined distance or more from the position of the possible white line to be reached that is predicted by the white line position predicting unit.

According to the 3rd aspect of the present invention, in the on-vehicle control device according to the 1st aspect, it is preferred that the predetermined condition is a condition in which a change in inclination is different from a change in inclination predicted with movement of the vehicle.

According to the 4th aspect of the present invention, in the on-vehicle control device according to the 2nd aspect, it is preferred that the white line judging unit divides the overhead view image into a plurality of regions with division lines radially extending from a position of the image-capturing device, adds points to a score of a region where a possible white line satisfying the predetermined condition is detected, subtracts points from the score of the region where no possible white line satisfying the predetermined condition is detected, and determines a possible white line in a region having a score equal to or greater than a predetermined threshold, as a white line due to an adhered matter.

According to the 5th aspect of the present invention, in the on-vehicle control device according to the 4th aspect, it is preferred that in the white line judging unit, a value of the predetermined threshold used when the score of the region increases is larger than a value of the threshold used when the score of the region decreases.

According to the 6th aspect of the present invention, an on-vehicle control device comprises: an image acquiring unit that acquires an image from an image-capturing device that captures the image of surroundings of a vehicle; a white line recognizing unit that recognizes possible white lines on a road surface, from the image acquired by the image acquiring unit; a white line information saving unit that saves information about the possible white lines recognized by the white line recognizing unit; a white line position predicting unit that predicts a position of a possible white line to be reached, based on information about a previous possible white line saved by the white line information saving unit and vehicle behavior information; and a white line judging unit that excludes, among the possible white lines recognized by the white line recognizing unit, a possible white line that satisfies a condition in which a position of a possible white line deviates by a predetermined distance or more from the position of the possible white line to be reached that is predicted by the white line position predicting unit.

Advantageous Effects of Invention

According to the present invention, it is possible to properly exclude false white line images in white line recognition.

DESCRIPTION OF EMBODIMENTS

Figure 1:
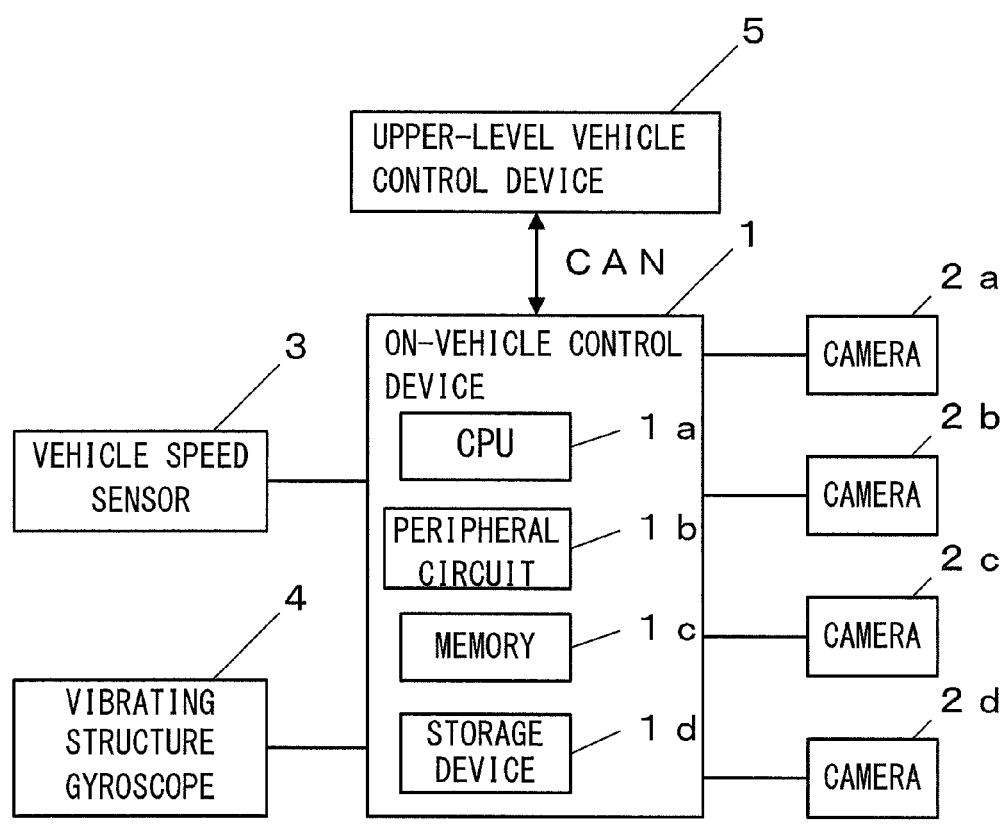
FIG. 1 A block diagram illustrating an on-vehicle control device 1 according to one embodiment of the present invention.

FIG. 1 is a block diagram illustrating an on-vehicle control device 1 according to one embodiment of the present invention. The on-vehicle control device 1 illustrated in FIG. 1 is mounted on a vehicle for use. Cameras 2a, 2b, 2c, and 2d, a vehicle speed sensor 3, and a vibrating structure gyroscope 4 are connected to the on-vehicle control device 1. The on-vehicle control device 1 is also connected to an upper-level vehicle control device 5 by way of a CAN (Controller Area Network).

The cameras 2a-2d are constructed by image sensors (image-capturing elements) such as CCDs and CMOSs, peripheral circuits, optical lenses, and other components and attached to parts of the vehicle, such as bodies, bumpers, and door mirrors. The cameras 2a-2d are referred to as image-capturing devices.

The cameras 2a-2d capture images (take pictures) of the surroundings of the vehicle in their respective different image-capturing ranges. The image-capturing ranges of these cameras are established so as to cover the entire surroundings of the vehicle by combination. It is assumed in this embodiment that the camera 2a captures an image of an image-capturing range ahead of the vehicle, the camera 2b captures an image of an image-capturing range on the left side of the vehicle, the camera 2c captures an image of an image-capturing range on the right side of the vehicle, and the camera 2d captures an image of an image-capturing range behind the vehicle. The respective captured images acquired by the cameras 2a-2d in a predetermined frame rate interval are output to the on-vehicle control device 1.

The on-vehicle control device 1 generates an overhead view image (top-view image) representing the entire surroundings of the vehicle seen from above, based on the respective captured images acquired by the cameras 2a-2d. The overhead view image is generated by performing coordinate transformation (overhead view transformation) on the respective captured images of the cameras 2a-2d according to their image-capturing directions and then stitching and synthesizing the images.

Figure 2:
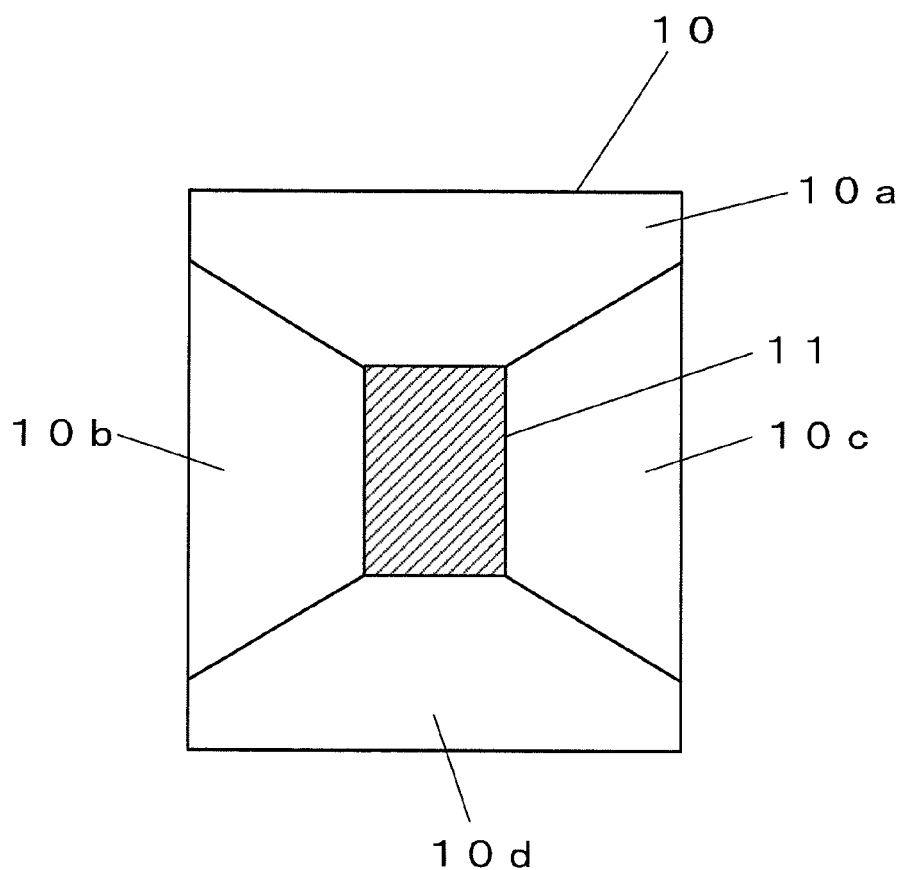
FIG. 2 A view illustrating an example of an overhead view image 10 generated by the on-vehicle control device 1.

FIG. 2 is a view illustrating an example of an overhead view image 10 generated by the on-vehicle control device 1. The overhead view image 10 is composed of four image regions 10a, 10b, 10c, and 10d which correspond to the ranges ahead of, on the left side of, on the right side of, and behind the vehicle 11, respectively. The images in these image regions are created based on the images captured by the cameras 2a-2d in FIG. 1, respectively. The overhead view image 10 is a plan view seen from above the vehicle 11.

The on-vehicle control device 1 recognizes white lines of parking frames (parking range lines) or driving traffic lanes in the surroundings of the vehicle, by performing a predetermined operating process based on the generated overhead view image. The result of recognizing the white lines of parking frames or driving traffic lanes is output to the upper-level vehicle control device 5 by way of the CAN and used for parking assistance, driving control or other operations of the vehicle. For example, parking assistance can be achieved by calculating a traveling path to a parking frame based on the relative position and attitude of the vehicle to the parking frame and by notifying a driver of the timing of braking or shift position change operation or the amount of steering angle to be turned. In this way, parking operation can be completed in a short time, even by a driver unaccustomed to driving operations such as parking. In addition, it is also conceivable to calculate a traveling path to a parking frame based on the relative position and attitude of the vehicle to the parking frame and automatically calculate control amounts of forward/backward and rotational movements of the vehicle and to automatically control movement of the vehicle based on the calculation result. In this way, parking operation can be completed safely and accurately, even by a driver unaccustomed to driving operations such as parking.

As described above, the result of recognizing the white lines is used for parking assistance, driving control or other operations of the vehicle. Thus, an accurate white line recognition result is required.

It is also known that images resembling white lines appear in the overhead view image, due to the effect of raindrops and other foreign matters adhered to the lenses of the cameras, when the overhead view image is generated from the images captured by the cameras 2a-2d, respectively. Then, the images can be erroneously recognized as white lines. Furthermore, it is known that three-dimensional objects such as guardrails and trees appear in a collapsed or falling state in the overhead view image, when the overhead view image is generated. Then, the collapsed images can also be erroneously recognized as white lines. The term "three-dimensional objects" as used herein refers to objects having components upwardly extending from a road surface, a ground surface and the like, such as guardrail posts and trees, for example. The term "upward" as used herein includes, but not limited to, "perpendicular".

The on-vehicle control device 1 in this embodiment is characterized by properly excluding the erroneous recognition of white lines due to the effect of adhered waterdrops and the like, and the erroneous recognition of white lines due to collapse or falling down of three-dimensional objects such as guardrails and trees, as described above. In this point of view, the on-vehicle control device 1 may also be referred to as an on-vehicle white line recognizing device. The on-vehicle control device 1 may also be referred to as an on-vehicle image processing device, because it processes the images captured by the cameras 2a-2d. This will be described in detail hereinafter.

The on-vehicle control device 1 includes therein a CPU 1a, a peripheral circuit 1b, a memory 1c, a storage device 1d such as a hard disk, and other components. The on-vehicle control device 1 executes a predetermined program stored in the memory 1*c* to properly exclude the erroneous recognition of white lines due to the effect of adherent waterdrops and the like, and the erroneous recognition of white lines due to collapse or falling down of three-dimensional objects, such as guardrails and trees.

Figure 3:
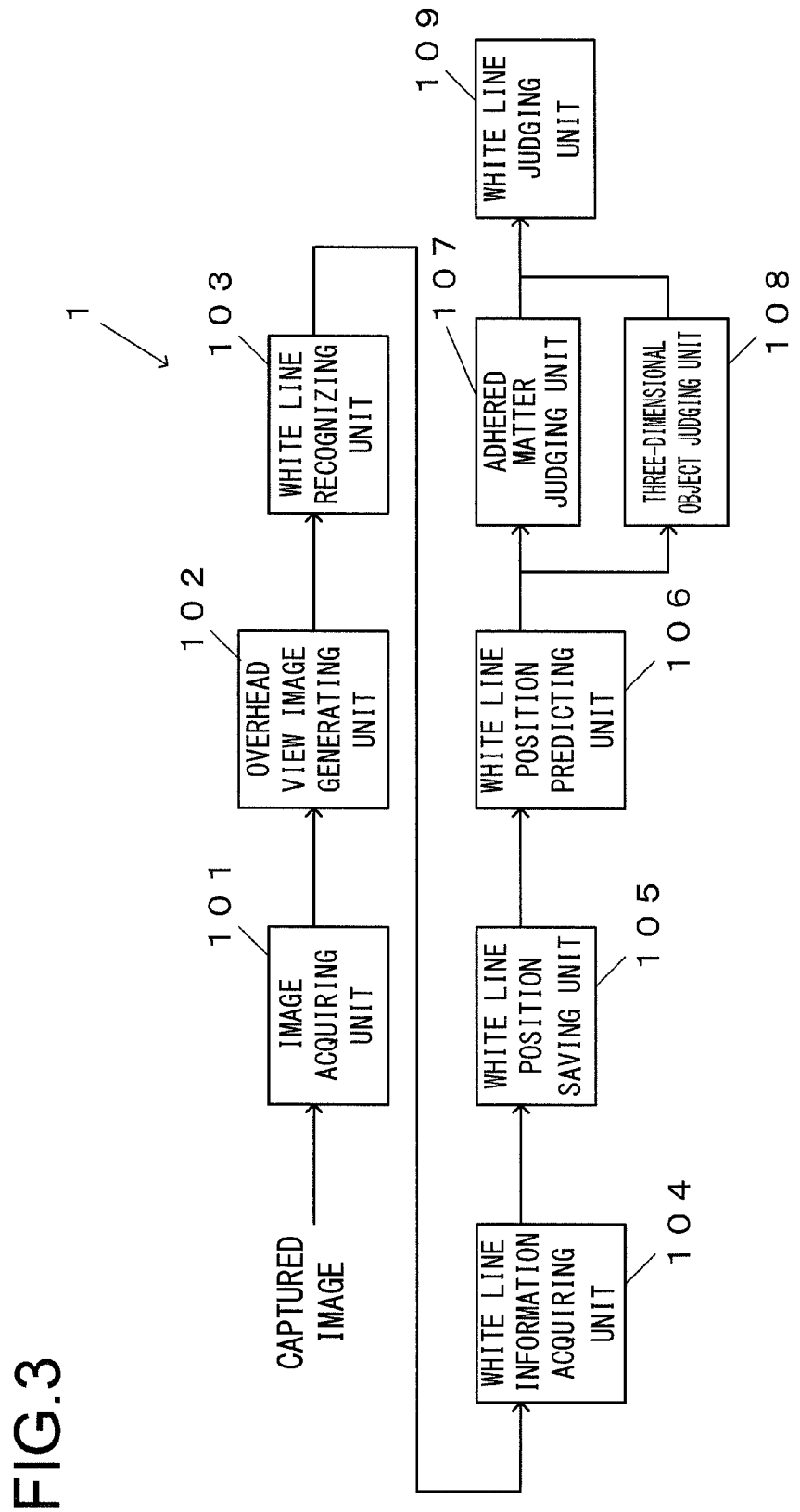
FIG. 3 A control block diagram of an arithmetic processing performed by the on-vehicle control device 1.

FIG. 3 is a control block diagram of an arithmetic processing performed by the on-vehicle control device 1. As illustrated in FIG. 3, the on-vehicle control device 1 operatively includes control blocks such as an image acquiring unit 101, an overhead view image generating unit 102, a white line recognizing unit 103, a white line information acquiring unit 104, a white line position saving unit 105, a white line position predicting unit 106, an adhered matter judging unit 107, a three-dimensional object judging unit 108, and a white line judging unit 109. Each of these control blocks is achieved by the CPU 1*a* of the on-vehicle control device 1 executing a program corresponding to each of the control blocks. The control blocks will be described hereinafter.

The image acquiring unit 101 acquires captured images from the camera 2*a*-2*d* sequentially at a predetermined time interval.

The overhead view image generating unit 102 generates an overhead view image by performing coordinate transformation (overhead view transformation) on the captured images of the cameras 2*a*-2*d* according to their image-capturing directions and then stitching and synthesizing the images. As illustrated in FIG. 2, the overhead view image 10 is composed of four image regions 10*a*, 10*b*, 10*c*, and 10*d* which correspond to the ranges ahead of, on the left side of, on the right side of, and behind the vehicle 11, respectively and also correspond to the cameras 2*a*-2*d* in FIG. 1, respectively.

The white line recognizing unit 103 analyzes the overhead view image generated by the overhead view image generating unit 102 to recognize white lines drawn on a road surface. For example, there is a method of extracting an edge point in the overhead view image to recognize white lines based on the extracted edge point, wherein the edge point has a change in brightness equal to or larger than a predetermined threshold in a horizontal search. However, methods of recognizing white lines from an overhead view image are well-known and any of various well-known methods may be employed in this embodiment.

The white line information acquiring unit 104 acquires white line information about the thus recognized white lines. The white line information includes positional information of end points of the white lines, information about whether each white line is a solid white line or a dashed white line, and other information. The white line position saving unit 105 stores the white line information acquired by the white line information acquiring unit 104 in the storage device 1*d* in the on-vehicle control device 1. Previously stored white line information has also been saved in the storage device 1*d* and the information about the currently recognized white lines is saved in addition to the previous white line information.

The white line position predicting unit 106 predicts a position to be reached by a target white line, from the previous white line positional information of the white line stored in the storage device 1*d* and vehicle behavior information. The vehicle behavior information is acquired by the on-vehicle control device 1 performing a well-known dead reckoning processing based on signals from the vehicle speed sensor 3 and the vibrating structure gyroscope 4. In other words, information about how and at which speed the vehicle moves is acquired as the vehicle behavior information. The white line position predicting unit 106 analyzes the behavior of the white line in the overhead view image based on the vehicle behavior information, and calculates and predicts a position to be ultimately reached by the white line.

The adhered matter judging unit 107 judges, among the white lines recognized as white lines by the white line recognizing unit 103, false white lines which have been recognized as white lines due to the effect of raindrops, waterdrops, or other adhered matters adhered to the lenses of the cameras 2*a*-2*d*, as described hereinafter. The three-dimensional object judging unit 108 judges, among the white lines recognized as white lines by the white line recognizing unit 103, false white lines which have been recognized as white lines and are actually images of three-dimensional objects, such as guardrails and trees, appearing in a collapsed or falling down state in the overhead view image transformation, as described hereinafter.

The white line judging unit 109 performs a processing of excluding the white lines judged as not being true white lines in the adhered matter judging unit 107 and the three-dimensional object judging unit 108, from the white lines recognized as white lines in the white line recognizing unit 103.

Figure 4:
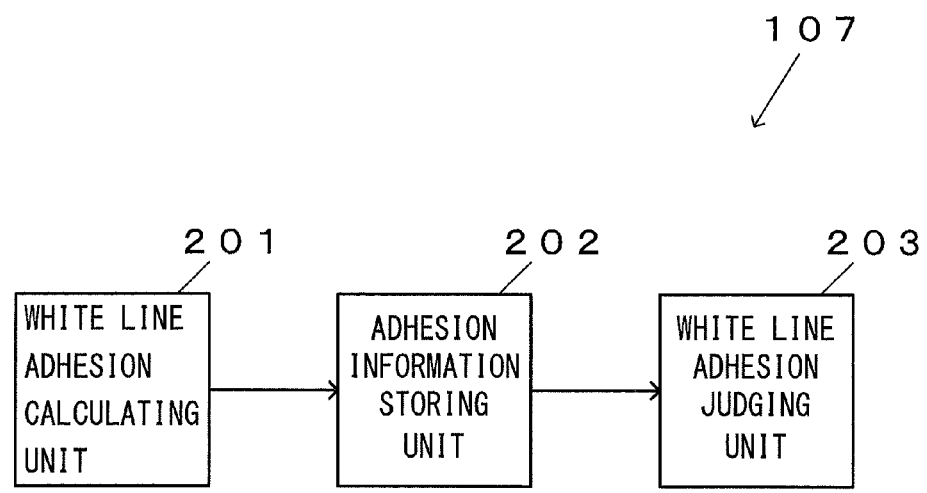
FIG. 4 A detailed control block diagram of an adhered matter judging unit 107.

The adhered matter judging unit 107 will now be described further in detail. FIG. 4 is a detailed control block diagram of an adhered matter judging unit 107. The adhered matter judging unit 107 is constructed by a white line adhesion calculating unit 201, an adhesion information storing unit 202, a white line adhesion judging unit 203, and other units. Each of these control blocks is also achieved by the CPU 1*a* of the on-vehicle control device 1 executing a program corresponding to the control block.

The adhered matter judging unit 107 judges white lines that are erroneously detected as white lines due to the fact that light or surroundings showing in waterdrops appear whitish in the image of the camera, when waterdrops such as raindrops adhere to the lens or the like of the cameras 2*a*-2*d*. Experiments, simulations and the like have shown that these false white lines due to the effect of waterdrops extend on radial lines from the image-capturing device in the overhead view image. This is believed to be a result of images extending in a perpendicular direction from the road surface in waterdrops. Accordingly, the white lines extending on radial lines (radially) from the image-capturing device are to be subject of judgement in the adhered matter judging unit 107. In order to determine whether a given white line extends on a radial line from the image-capturing device, it can be judged, based on end point information about both longitudinal ends of the white line, whether these end points are located on the radial line.

The white line adhesion calculating unit 201 reads out the previous white line information stored in the storage device 1*d* by the white line position saving unit 105 and determines whether a white line has been recognized at the same position (the same position having a predetermined range) as that of the currently recognized white line on the radial line, in a predetermined number of most recent recognition processings. Thereby, it can be determined whether the white line located on the radial line does not move and remains fixed. Then, any fixed white line on the radial line can be determined as a false white line due to the effect of waterdrops such as raindrops.

Alternatively, the white line position predicting unit 106 predicts a position to be reached by the white line, based on the vehicle behavior information, and the white line adhesion calculating unit 201 calculates whether the current position of the white line deviates from its predicted position by a predetermined value or more. If the current position of the white line deviates from its predicted position by a predetermined value or more, then the white line is determined as not being a true white line, but a false white line due to the effect of adhesion of raindrops and the like. Also in this way, a white line located on the radial line can be determined as not being a true white line, but a false white line due to the effect of adhesion of raindrops and the like. This determination may also be made under an AND condition of the above-described two determination methods in the white line adhesion calculating unit 201.

Furthermore, if the vehicle is stopped, a true white line that is located on a radial line is also recognized as not moving and remaining fixed or it is determined that the current position of the white line does not deviate from its predicted position by the predetermined value or more. Therefore, in order to avoid such a case, processing conditions in the white line adhesion calculating unit 201 include also a condition in which the vehicle has moved a predetermined distance (for example 0.2 meters) or more.

The adhesion information storing unit 202 stores adhesion information of the white line in accordance with the position of the white line, based on the result from the white line adhesion calculating unit 201. As described above, experiments, simulations and the like have shown that the false white lines due to the effect of waterdrops extend on radial lines from the image-capturing device in the overhead view image. Therefore, in this embodiment, the overhead view image is divided into a plurality of partitions with lines radially extending from the camera, and managed by providing scores (points) for each partition. This will be described hereinafter.

Figure 5:
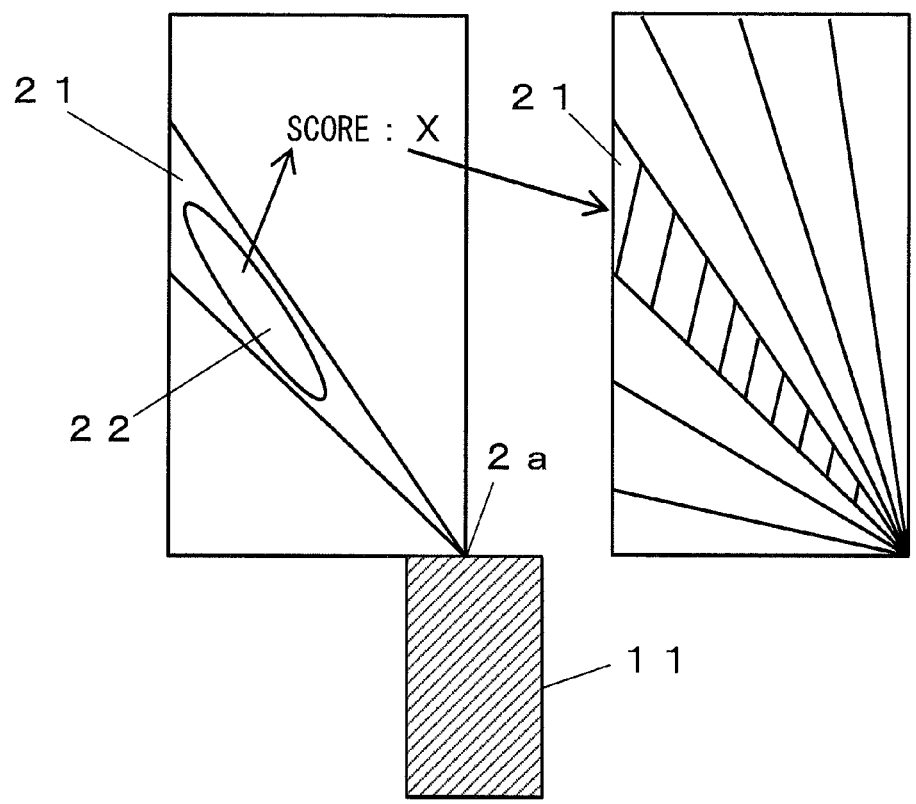
FIG. 5 A view illustrating an example of dividing the overhead view image into a plurality of partitions with radially extending lines.

FIG. 5 is a view illustrating an example of dividing the overhead view image into a plurality of partitions with lines which extend radially. Score areas corresponding to the divided partitions are provided in the memory 1c. FIG. 5 illustrates an example in which the left half side of the overhead view image based on the image from the camera 2a, which captures the image of the range ahead of the vehicle 11, is divided into a plurality of regions. If a white line 22 is recognized in a region 21 and the white line adhesion calculating unit 201 determines that the white line 22 is a false white line due to the effect of waterdrops such as raindrops, then the adhesion information storing unit 202 adds some points to the score of the region 21. The white line 22 in the region 21 is recognized based on the determination whether coordinates of both end points of the white line 22 are within the region 21.

The white line adhesion judging unit 203 determines whether the score, which is adhesion information that each radially partitioned region has, is equal to or larger than a predetermined threshold. Here, the white line adhesion judging unit 203 determines the white line on the radial line in the region having its score equal to or larger than the predetermined threshold, as not a true white line, but a false white line due to the effect of adhesion of raindrops and the like.

The score will be described hereinafter. For the region where there is any white line determined as a false white line due to the effect of waterdrops such as raindrops by the white line adhesion calculating unit 201, 7 points is added to the score, for example. On the other hand, for the region where there is no white line determined as a false white line due to the effect of waterdrops such as raindrops by the white line adhesion calculating unit 201, 2 points is subtracted from the score. Additionally, for the region where the radial white lines are reliably determined as true dashed white lines, 5 points is subtracted from the score. Furthermore, if the vehicle has not moved a predetermined distance (for example, 0.2 meters) or more, a predetermined value is subtracted.

In this way, when a waterdrop adheres to the lens and remains there, the score is added up. Then, if the score becomes equal to or larger than the predetermined threshold, for example 70 points, then the adhesion judgment is on. If any radial white line is recognized in the region where the adhesion judgment is on, then the white line is determined as a false white line due to the effect of waterdrops such as raindrops.

On the other hand, it is also necessary to address a case where a raindrop is removed because of a change in circumstances. For this purpose, the above-described subtraction processing is performed. Thus, if the score becomes equal to or smaller than a predetermined threshold, for example 55 points, then the adhesion judgment is off. In the region where the adhesion judgment is off, no white line is determined as a false white line due to the effect of waterdrops such as raindrops, even if radial white lines are recognized and the white line adhesion calculating unit 201 determines that they are false white lines.

The adhere judgment with the score of the region (zone) is performed because it is inadequate to determine whether a waterdrop is adhered or removed based on only one change in the waterdrop. By performing the above-described processing, the determination of the effect of raindrops can be made in a stable and proper manner.

Figure 6:
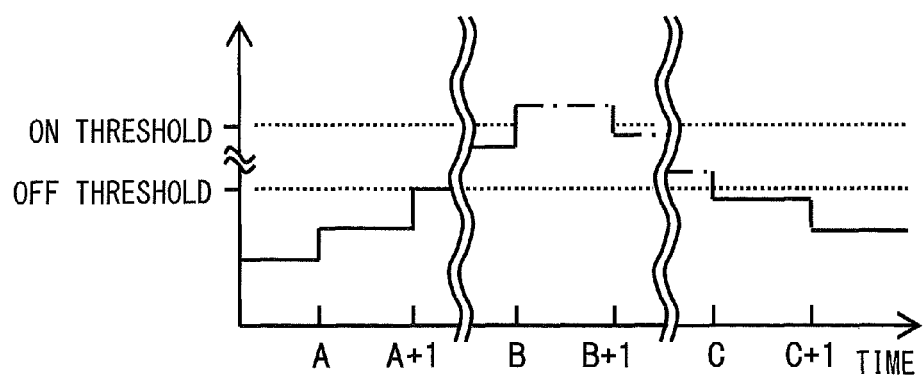
FIG. 6 A view illustrating score calculation and on/off of judgment.

It will be noted that the threshold for switching on is set to be different from the threshold for switching off in this embodiment. For example, the threshold for switching on may be 70 points, while the threshold for switching off may be smaller, 55 points. By providing the thresholds with a hysteresis in this way, chattering in switching on or off can be avoided. FIG. 6 is a view illustrating the above-described score calculation and on/off of judgment.

Figure 7:
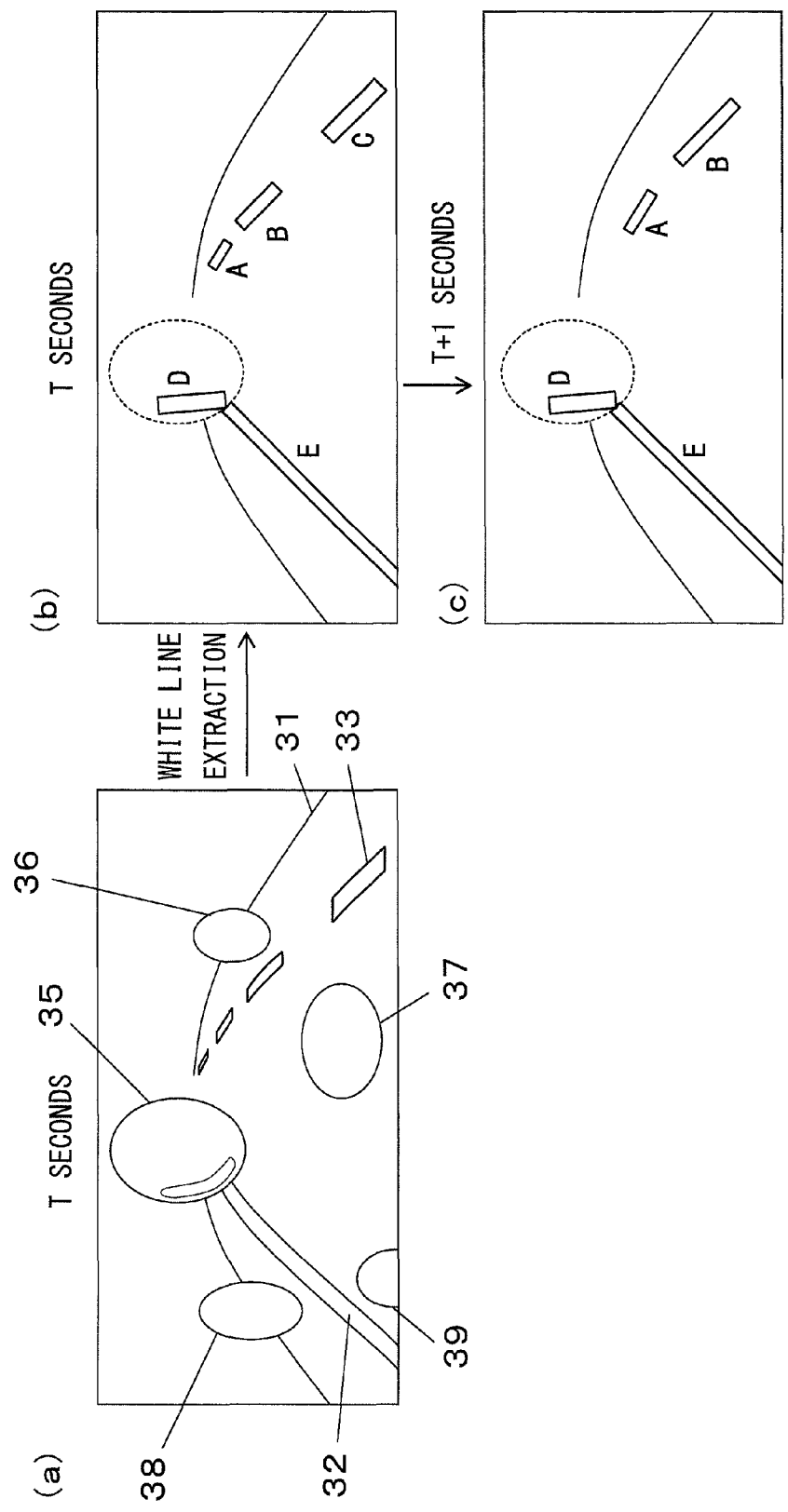
FIG. 7 A view illustrating how a false white line image is determined as a white line due to the effect of raindrops.

FIG. 7 is a view illustrating how a false white line image due to the effect of raindrops as described above is determined as a white line. FIG. 7(a) illustrates a live view image (live view picture) of the range ahead of the vehicle captured by the camera 2a at the time T seconds, for example. The term "live view image" as used herein refers to a raw image (picture) captured by the camera 2a. In FIG. 7(a), a solid traffic lane line 32 and a dashed traffic lane line 33 are drawn on a road 31. Waterdrops 35-39 are also shown in this figure. Light is observed in the waterdrop 35, which is likely to be mistaken as a white line.

FIG. 7(b) illustrates an image after white line recognition processing on the image of the live view image in FIG. 7(a). Although the example in which the white line recognition processing is performed on the overhead view image has been described in this embodiment, FIG. 7(b) illustrates an example in which the white line recognition processing is performed on the image in FIG. 7(a), for the sake of convenience. In FIG. 7(b), true white lines A-E as well as a false white line D recognized as a white line due to the effect of waterdrops are shown.

Turning to FIG. 7(c), a change in the white line recognition at the time T+1 seconds is shown. FIG. 7(c) illustrates that the white lines displayed in the image move backward, that is, the white lines A and B slightly move backward and the white line C disappears, with forward movement of the vehicle. The white line E can be determined as a solid line because a bottom end of the white line E is in contact with a boundary of the acquired image or is present within a predetermined range from the boundary, which means that the length of the white line is larger than the length that can be recognized from the image. Therefore, the white line E appears to remain unchanged. Furthermore, the position of the white line D remains unchanged.

Figure 8:
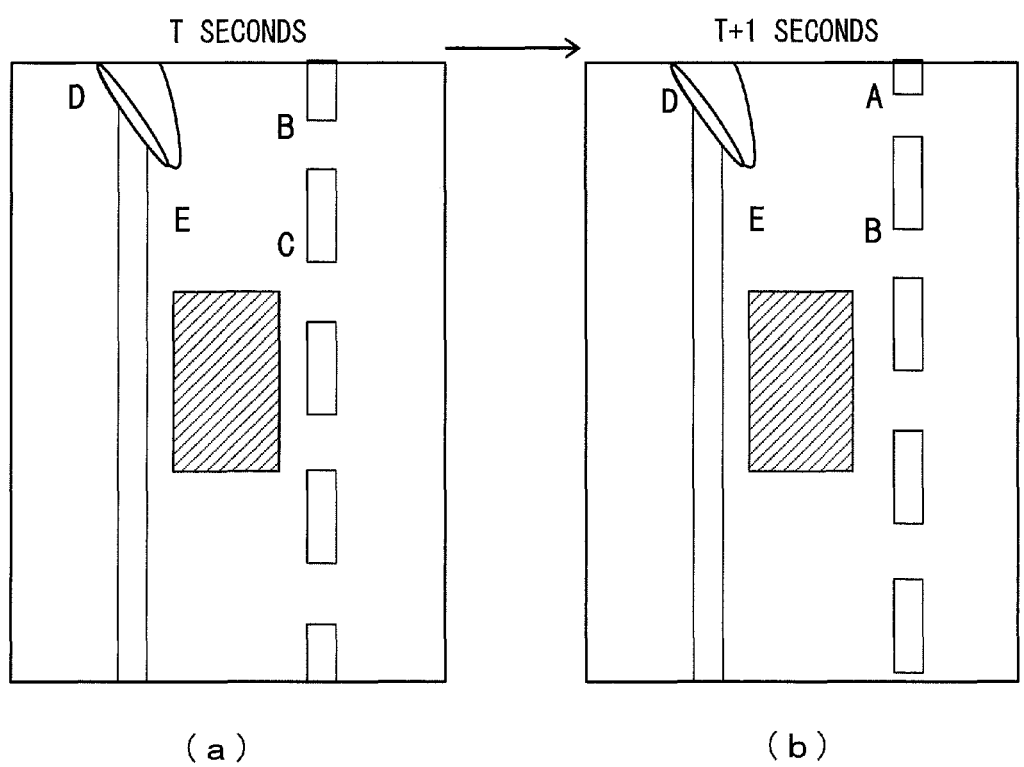
FIG. 8 A view illustrating how the image in FIG. 7 is transformed into an overhead view image.

FIG. 8 is a view illustrating how the image in FIG. 7 described above is transformed into an overhead view image. FIG. 8(a) is an overhead view image corresponding to FIG. 7(a) or FIG. 7(b), while FIG. 8(b) is an overhead view image corresponding to FIG. 7(c). It can be seen in the overhead view image in FIG. 8 that the white line D radially extends from the position of the front camera 2a and that the white lines A-C move, while the white line D remains at the same position and does not move, even if the vehicle moves from the time T seconds to the time T+1 seconds. Consequently, the white line D can be determined as a false white line due to the effect of waterdrops, based on the above-described determination.

Figure 9:
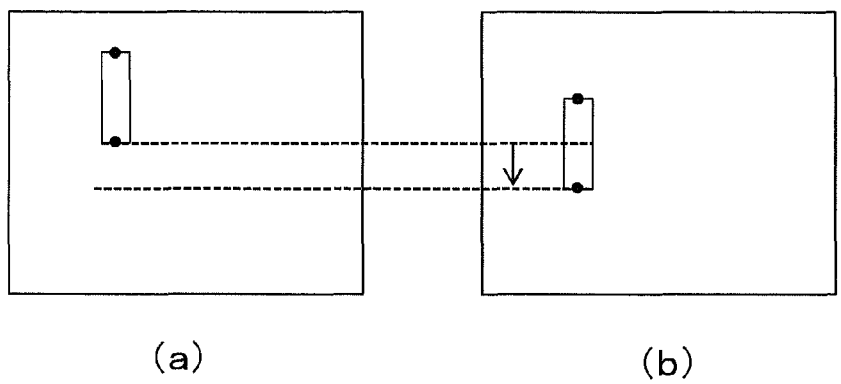
FIG. 9 A view illustrating movement of a white line drawn on a road surface and movement of a waterdrop on a lens detected as a white line, in the overhead view image.
Figure 9:
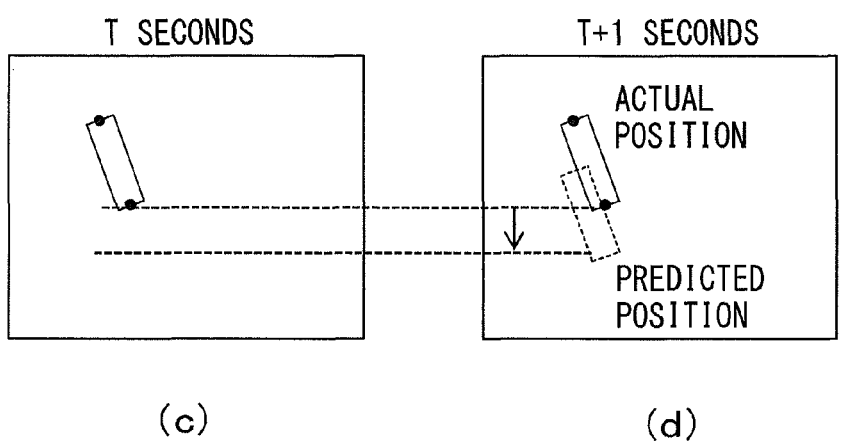

FIG. 9 is a view illustrating movement of a white line drawn on a road surface and movement of a waterdrop on a lens detected as a white line, in the overhead view image. FIG. 9(a) illustrates a true white line at the time T seconds and FIG. 9(b) illustrates how the true white line moves when the vehicle moves T+1 seconds. On the other hand, FIG. 9(c) illustrates a white line detected due to the effect of waterdrops on the lens at the time T seconds and FIG. 9(d) illustrates the white line detected due to the effect of waterdrops on the lens when the vehicle moves T+1 seconds. In FIG. 9(d), the position of the white line predicted by the white line position predicting unit 106 is denoted by a dotted line. However, the actually recognized white line is located at the position denoted by a solid line and therefore there is no change in position in comparison to FIG. 9(c). In this manner, it is found that the white line detected due to the effect of waterdrops on the lens does not move.

Figure 10:
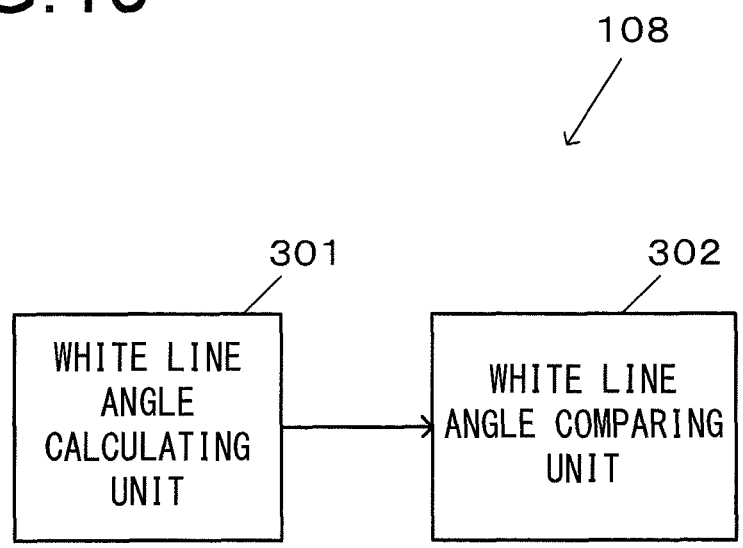
FIG. 10 A detailed control block diagram of a three-dimensional object judging unit 108.

The three-dimensional object judging unit 108 will now be described further in detail. FIG. 10 illustrates a detailed control block diagram of the three-dimensional object judging unit 108. The three-dimensional object judging unit 108 is constructed by a white line angle calculating unit 301, a white line angle comparing unit 302, and other units. Each of these control blocks is also achieved by the CPU 1a of the on-vehicle control device 1 executing a program corresponding to the control block.

The white line angle calculating unit 301 calculates an angle of a white line recognized by the white line recognizing unit 103. For example, an angle of a line connecting both longitudinal end points of the white line is calculated with reference to the horizontal direction in the overhead view image. In addition, information about a previous white line that was most recently stored in the storage device 1d by the white line position saving unit 105 is read out and the angle of the white line is calculated in a similar manner. The white line angle calculating unit 301 further predicts movement of the read out previous white line as a three-dimensional object with movement of the vehicle, under the assumption that the white line represents a three-dimensional object. Here, the white line angle calculating unit 301 also predicts a change in angle of the white line as a three-dimensional object in order to predict movement of the white line.

The white line angle comparing unit 302 determines whether any of the currently recognized white lines matches the white line whose movement has been predicted by the white line angle calculating unit 301 under the assumption that the white line represents a three-dimensional object. Any matching white line is then determined as a false white line due to the collapsed or falling-down image of the three-dimensional object and excluded from the true white lines.

In this way, among the white lines recognized by the white line recognizing unit 103, white lines having their slopes or inclinations changed with movement of the vehicle can be determined as false white lines and excluded. Specifically, any white line having a change in angle between the current and previous positions of the same white line comparable to the change in angle of the white line representing the three-dimensional object can be determined as false white lines and excluded.

Figure 11:
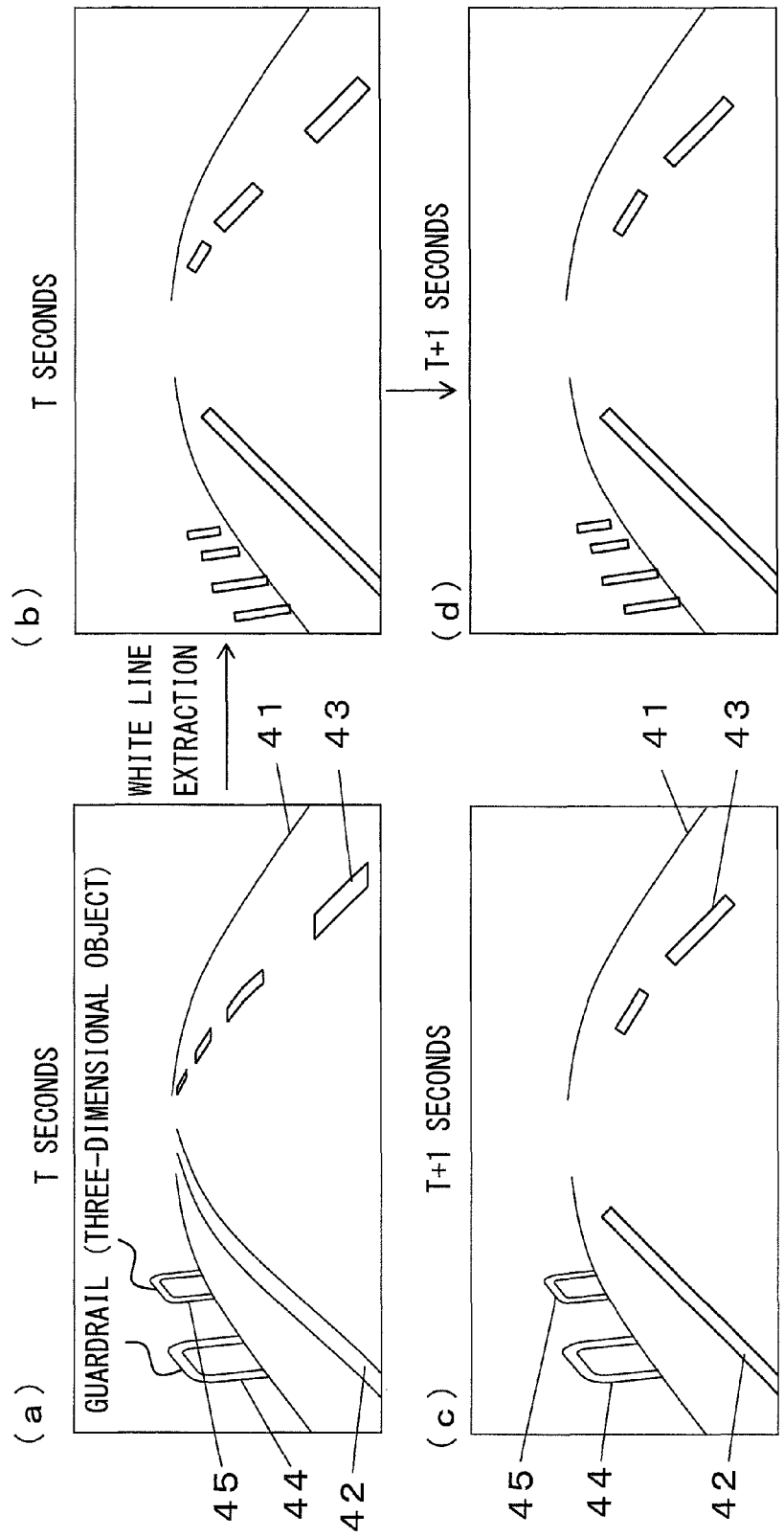
FIG. 11 A view illustrating a guardrail which is a three-dimensional object.

FIG. 11 is a view illustrating a guardrail which is a three-dimensional object as described above. FIG. 11(a) illustrates a live view image (live view picture) of the range ahead of the vehicle captured by the camera 2a at the time T seconds, for example. In FIG. 11(a), a solid traffic lane line 42 and a dashed traffic lane line 43 are drawn on a road 41. Guardrails 44, 45 are also shown in this figure.

FIG. 11(b) illustrates an image after white line recognition processing on the image of the live view image in FIG. 11(a). Although the example in which the white line recognition processing is performed on the overhead view image has been described in this embodiment, FIG. 11(b) illustrates an example in which the white line recognition processing is performed on the image in FIG. 11(a), for the sake of convenience.

FIG. 11 (c) illustrates a live view image (live view picture) of the range ahead of the vehicle captured by the camera 2a at the time T+1 seconds. FIG. 11(c) illustrates how guardrails 44, 45 move backward with forward movement of the vehicle. FIG. 11(d) illustrates an image after white line recognition processing on the image of the live view image in FIG. 11(c).

Figure 12:
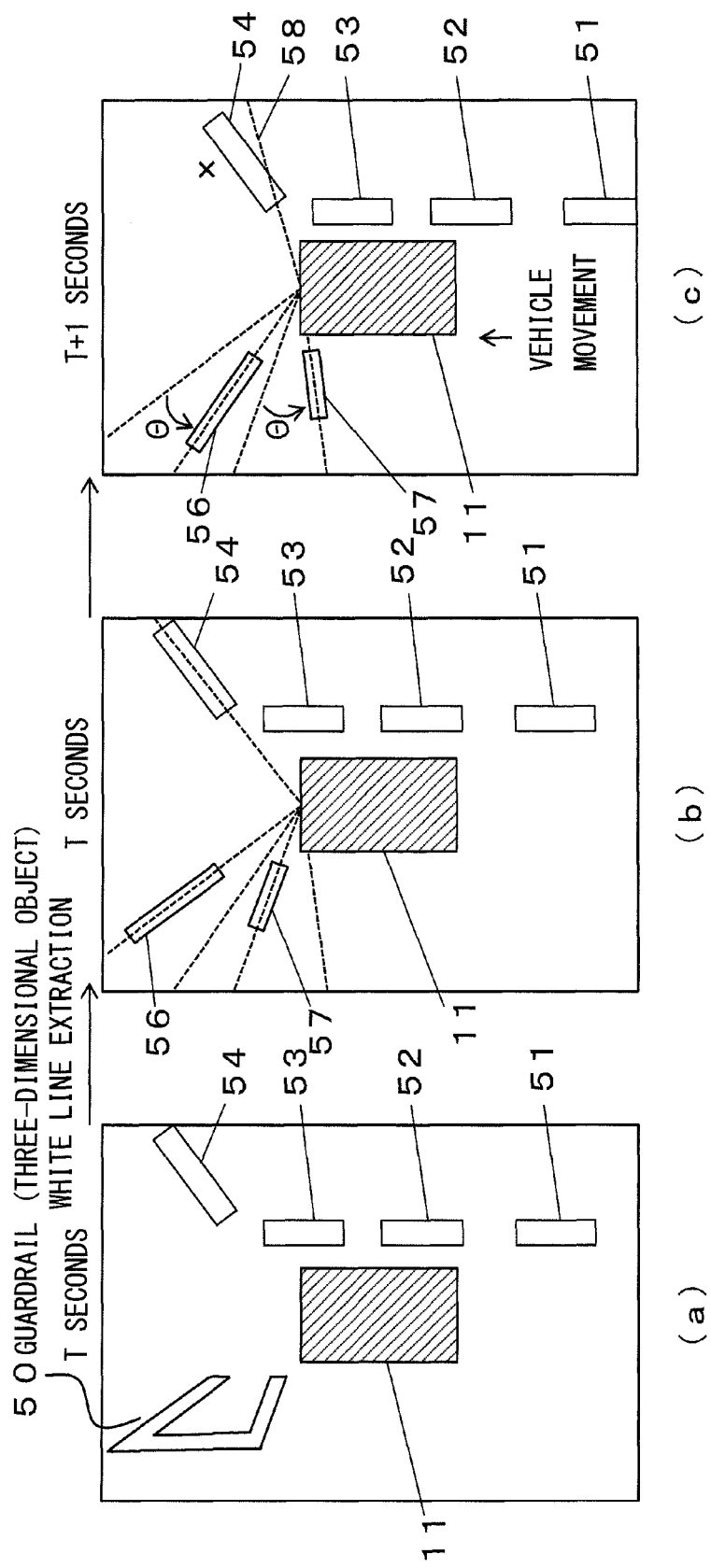
FIG. 12 A view illustrating how the image in FIG. 11 is transformed into an overhead view image.

FIG. 12 is a view illustrating how the image in FIG. 11 described above is transformed into an overhead view image. FIG. 12(a) is an overhead view image at the time T seconds. However, for the sake of explanation, only one guardrail 50 is shown and only right dashed traffic lane lines 51-54 are shown as traffic lane lines, wherein the traffic lane line 54 is shown as being oblique to the right on the top side of the dashed traffic lane lines (farthest in the vehicle traveling direction). The traffic lane line 54 is a true traffic lane line. In this case, the traffic lane lines are white lines.

FIG. 12(b) is a view illustrating the result of performing white line recognition processing on the overhead view image in FIG. 12(a) and extracting white lines. The white lines 51-54 are extracted, and posts of the guardrail 51 (three-dimensional objects), which extend in a perpendicular direction, are also extracted as white lines 56, 57.

FIG. 12(c) is a view illustrating the result of white line extraction processing at the time T+1 seconds. In other words, this is the result of white line extraction processing on the overhead view image after the vehicle 11 has moved one second. As apparent from comparison between FIG. 12(b) at the time T and FIG. 12(c) at the time T+1 seconds, the white lines 51-54 only move backward in parallel to the vehicle with movement of the vehicle 11 and the slopes (inclinations) of the white lines remain unchanged. On the other hand, it can be seen that the white lines 56, 57 move backward in reference to the vehicle with movement of the vehicle 11 and the slopes of the white lines change as well.

Assuming that the information in FIG. 12(c) is the currently acquired information, the information in FIG. 12(b) is the most recent previous information and has been stored in the storage device 1d. When movement for each white line that was previously detected and, in particular, is oblique in FIG. 12(b), including a change in angle of the white line is predicted under the assumption that the white line represents a three-dimensional object, then it can be predicted that the white lines 56, 57 move to the positions in FIG. 12(c), with their angle changing. On the other hand, it can be predicted that the white line 54 would move onto a dashed line 58 in FIG. 12(c), if the white line 54 were a three-dimensional object. However, the white line 54 does not move onto the dashed line 58.

In this way, movement is predicted under the assumption that a white line represents a three-dimensional object. Then, if it is confirmed that the target white line moves to the predicted position, the white line is excluded from the true white lines, because the confirmation indicates that a three-dimensional object has been falsely determined as a white line. On the other hand, if it cannot be confirmed that the target white line moves to the predicted position, the white line is determined as a true white line. It will be noted that the behavior of the three-dimensional object in the overhead view image has been previously known form experiments, simulations and the like. Therefore, these experiment result and calculation result may be utilized to predict movement of the white line under the assumption that the white line represents a three-dimensional object.

According to the embodiment described above, the following operational advantages can be achieved.

(1) An on-vehicle control device 1 is configured to acquire captured images from cameras 2a-2d (image-capturing devices) which capture images of the surroundings of a vehicle (an image acquiring unit 101); generate an overhead view image, which is a plan view of the surroundings of the vehicle seen from above the vehicle, from the acquired image (an overhead view image generating unit 102); recognize white lines on a road surface, from the overhead view image (a white line recognizing unit 103); save information about the recognized white lines in a storage device 1d (a white line position saving unit 105); predict a position to be reached by each white line, based on the saved previous white line information and vehicle behavior information (a white line position predicting unit 106); and exclude any white line that is present at substantially the same position as the white line in the saved previous white line information and satisfies a condition in which its position deviates by a predetermined distance or more from a predicted position to be reached by the white line, as a false white line. In this way, it can be reliably prevented by means of a simple method to erroneously recognize images of objects other than true white lines as white lines, due to the effect of raindrops (waterdrops) adhered to the lenses of the cameras 2a-2d.

(2) The on-vehicle control device 1 is configured to divide the overhead view image into a plurality of regions with division lines which radially extend from positions of the cameras 2a-2d (image-capturing devices); add some points to a score of the region where there is any white line satisfying a white line condition due to the effect of raindrops (waterdrops) and the like, each time such a white line is detected; and exclude the false white line that is located in the region having its score equal to or larger than a predetermined threshold and satisfies the white line condition due to the effect of raindrops (waterdrops), as a false white line. This is because it is inadequate to determine whether the waterdrop is adhered or removed based on only one change in the waterdrop. By performing the above-described processing, the determination of the effect of raindrops can be made in a stable and proper manner.

(3) The on-vehicle control device 1 is configured to subtract the score of the region where no false white line that satisfies the white line condition due to the effect of raindrops (waterdrops) and the like is detected. In this way, it is also possible to properly address a case where a raindrop (waterdrop) is removed because of a change in circumstances.

(4) The on-vehicle control device 1 is configured so that a value of the threshold used when the score of the region increases is larger than a value of the threshold used when the score of the region decreases. In other words, the thresholds are set to form a hysteresis. In this way, chattering in switching the judgment on or off can be avoided.

(5) The on-vehicle control device 1 is configured to acquire captured images from cameras 2a-2d (image-capturing devices) which capture images of the surroundings of a vehicle (an image acquiring unit 101); generate an overhead view image, which is a plan view of the surroundings of the vehicle seen from above the vehicle, from the acquired image (an overhead view image generating unit 102); recognize white lines on a road surface, from the overhead view image (a white line recognizing unit 103); and exclude, among the recognized white lines, white lines having their slopes changed with movement of the vehicle as false white lines. In this way, it can be reliably prevented by means of a simple method to erroneously recognize collapsed or falling-down images of three-dimensional objects as white lines.

(6) The on-vehicle control device 1 is configured to save information about the recognized white lines in the storage device 1d (a white line information saving unit); predict movement including a change in angle of the white lines with movement of the vehicle, based on the previous white line information saved in the storage device 1d, under the assumption that the white line represents an image of a three-dimensional object; judge whether there is any white line that matches the white line whose movement has been predicted, from information about the currently recognized white line; and exclude the white line judged to match, as a false white line. In this way, it can be reliably prevented by means of a simple method to erroneously recognize collapsed or falling-down images of three-dimensional objects as white lines.

(7) The on-vehicle control device 1 is configured to save information about the white lines recognized by the white line recognizing unit in the storage device 1d (a white line information saving unit 105); calculate an angle of a white line from the previous white line information saved in the storage device 1d; calculate the angle of the line from the information about the same white line currently recognized; and exclude any white line having a change in angle between the current and previous positions of the same white line comparable to a predetermined change in angle of the white line representing the three-dimensional object, as false white lines. In other words, steps of predicting movement including a change in angle of the white lines with movement of the vehicle, based on the previous white line information saved in the storage device 1d, under the assumption that the white line represents an image of a three-dimensional object, and judging whether there is any white line that matches the white line whose movement has been predicted, from information about the currently recognized white line, correspond to steps of calculating angles of the current and previous positions of the same white line and determining whether its change in angle is comparable to the change in angle of the white line representing the three-dimensional object. Also in this way, it can be reliably prevented by means of a simple method to erroneously recognize collapsed or falling-down images of three-dimensional objects as white lines.

(Variation)

(1) Although the overhead view image based on the image of the range ahead of the vehicle captured mainly by the camera 2a among the cameras 2a-2d has been described in the above-described embodiment, it is not necessarily limited to this example. The present invention is equivalently applicable to a case where an overhead view image based on images captured by other cameras is utilized. A processing utilizing the entire overhead view image is also conceivable. In addition, it may be determined which camera's overhead view image should be utilized, depending on forward or backward gear positions. For example, an overhead view image based on the image of the camera 2a which captures the image of the range ahead of the vehicle may be used when in a forward gear position, while an overhead view image based on the image of the camera 2d which captures the image of the area behind the vehicle may be used when in a backward gear position.

(2) Although the above-described embodiment has been described as comprising four cameras 2a-2d, it is not necessarily limited to this example. The number and image-capturing ranges of cameras mounted on the vehicle are not limited to this example.

(3) Although the example involving adhesion of raindrops or waterdrops has been described in the above-described embodiment, it is not necessarily limited to this example. The present invention is equivalently applicable to a case involving adhesion of foreign matters behaving in a similar manner to raindrops or waterdrop as described above. The present invention is equivalently applicable to address reflection of sunlight in a road surface. An image of sunlight reflected in the road surface does not move even if the vehicle moves to some extent, and the image can be recognized in a similar manner to a white line.

(4) Although the above-described embodiment has been described with guardrails and trees as examples of three-dimensional objects, it is not necessarily limited to this example. The present invention is equivalently applicable to other three-dimensional objects besides guardrails and trees, i.e. all three-dimensional objects that upwardly extend from the road surface or ground surface and can be mistaken as white lines due to the effect of their collapse or falling down in the overhead view image.

(5) Although the case where the processing is performed by a single CPU 1a in the on-vehicle control device 1 has been described in the above-described embodiment, it is not necessarily limited to this example. There may be a plurality of CPUs, peripheral circuits, or LSIs in the on-vehicle control device 1 to share the above-described processing between these components as required.

(6) Although, as the processing in the adhered matter judging unit 107, the example in which white lines are recognized in the overhead view image and it is judged whether the white lines are false white lines due to the effect of raindrops and the like has been described in the above-described embodiment, it is not necessarily limited to this example. The present invention is equivalently applicable to a case where white lines are recognized in a live view image (live view picture) before transformation into the overhead view image. The example in which white lines are recognized in the live view image has been explained in the description of the above-described embodiment in FIG. 7, for the sake of explanation. As a variation, the white lines recognized in the live view image can also be used to judge whether the white lines are false white lines due to the effect of raindrops.

In this case, it has been found from experiments, simulations and the like that the white lines due to the effect of raindrops extend in a perpendicular direction from the road surface in the live view image. Accordingly, it may be judged whether the white lines recognized in the live view image are white lines extending in a perpendicular direction from the road surface, instead of white lines radially extending from the camera 2a as the judgment condition in the overhead view image. Other conditions are same as that described in the above-described embodiment.

In other words, it can also be adapted to recognize white lines on the road surface from the image of the live view image captured by the camera 2a; and exclude, among the recognized white lines, any white line that appears to extend in a perpendicular direction to the road surface, is present at the generally same position as the white line in the saved previous white line information, and satisfies a condition in which its position deviates by a predetermined distance or more from a predicted position to be reached by the white line, as a false white line.

In order to determine whether a given white line extends in a perpendicular direction from the image-capturing device, it can be judged, based on end point information about both longitudinal ends of the recognized white line, whether these end points are located in a perpendicular direction from the road surface in the live view image. In the live view image, the perpendicular direction from the road surface is considered to be a vertical direction in a screen, in principle. However, for a fish-eye lens and the like, it can also be taken into consideration that the perpendicular direction may become more or less oblique as it shifts to right or left in a lateral direction in the image.

Additionally, if the image is divided into a plurality of regions to provide scores, the image may be divided into a plurality of regions with division lines which extend in a perpendicular direction from the road surface in the live view image. In principle, in the live view image, the image may be divided with vertical division lines. However, for a fish-eye lens and the like, the image may be divided with division lines that becomes more or less oblique as they shift to right or left in a lateral direction the image. Furthermore, the image may also be laterally divided with a plurality of lateral division lines.

(7) Although, as the processing in the three-dimensional object judging unit 108, the example in which white lines are recognized in the overhead view image and it is judged whether the white lines are false white lines due to the effect of collapse or falling down of three-dimensional objects has been described in the above-described embodiment, it is not necessarily limited to this example. Also in this case, the present invention is applicable to a case where white lines are recognized in a live view image (live view picture) before transformation into the overhead view image. The example in which white lines are recognized in the live view image has been explained in the description of the above-described embodiment in FIG. 11, for the sake of explanation. As a variation, the white lines recognized in the live view image can also be used to judge whether the white lines are false white lines due to the effect of collapse or falling down of three-dimensional objects.

This is because it has been found from experiments, simulations and the like how white lines in the live view image move with movement of the vehicle, if three-dimensional objects is recognized as white lines in the live view image. In other words, it can be adapted to recognize white lines on the road surface from the image of the live view image captured by the camera 2a; predict movement including a change in angle of the recognized white lines based on movement of the vehicle, under the assumption that the white lines represents three-dimensional objects; judge whether there is any white line that matches the white line whose movement has been predicted, from the currently recognized white line information; and exclude the white line judged to match, as a false white line.

The above-described embodiment and various variations are merely exemplary and the present invention is not limited to the contents of the embodiment and variations, as long as the features of the invention are not impaired.

The contents disclosed in the following priority basic application is incorporated herein by reference.

Japanese Patent Application No. 2012-259062 (filed on Nov. 27, 2012)

REFERENCE SIGNS LIST

1 . . . control device, 2a, 2b, 2c, 2d . . . camera, 3 . . . vehicle speed sensor, 4 . . . vibrating structure gyroscope, 5 . . . vehicle control device, 101 . . . image acquiring unit, 102 . . . overhead view image generating unit, 103 . . . white line recognizing unit, 104 . . . white line information acquiring unit, 105 . . . white line position saving unit, 106 . . . white line position predicting unit, 107 . . . adhered matter judging unit, 108 . . . three-dimensional object judging unit, 109 . . . white line judging unit

The invention claimed is:

1. An on-vehicle control device comprising:
an image acquiring unit that acquires an image from an image-capturing device that captures the image of surroundings of a vehicle;
an overhead view image generating unit that generates an overhead view image from the image acquired by the image acquiring unit, the overhead view image being a plan view of the surroundings of the vehicle seen from above the vehicle;
a white line recognizing unit that recognizes possible white lines on a road surface in the overhead view image;
a white line information saving unit that saves information including positional information of the possible white lines recognized by the white line recognizing unit;
a white line position predicting unit that predicts a position of a possible white line to be reached, based on information about a previous possible white line saved by the white line information saving unit and vehicle behavior information; and
a white line judging unit that excludes, among the possible white lines recognized by the white line recognizing unit, a possible white line that extends in a radial direction from the image-capturing device in the overhead view image and satisfies a predetermined condition, wherein
the predetermined condition is either
at least one of a condition in which a possible white line is at the same position as the previous possible white line saved by the white line information saving unit and a condition in which a position of a possible white line deviates by a predetermined distance or more from the position of the possible white line to be reached that is predicted by the white line position predicting unit, or
a condition in which a change in inclination is different from a change in inclination predicted with movement of the vehicle.

2. The on-vehicle control device according to claim 1, wherein:
the white line judging unit divides the overhead view image into a plurality of regions with division lines radially extending from a position of the image-capturing device, adds points to a score of a region where a possible white line satisfying the predetermined condition is detected, subtracts points from the score of the region where no possible white line satisfying the predetermined condition is detected, and determines a possible white line in a region having a score equal to or greater than a predetermined threshold, as a white line due to an adhered matter.

3. The on-vehicle control device according to claim 2, wherein:
in the white line judging unit, a value of the predetermined threshold used when the score of the region increases is larger than a value of the threshold used when the score of the region decreases.

4. An on-vehicle control device comprising:
an image acquiring unit that acquires an image from an image-capturing device that captures the image of surroundings of a vehicle;
a white line recognizing unit that recognizes possible white lines on a road surface, from the image acquired by the image acquiring unit;
a white line information saving unit that saves information about the possible white lines recognized by the white line recognizing unit;
a white line position predicting unit that predicts a position of a possible white line to be reached, based on information about a previous possible white line saved by the white line information saving unit and vehicle behavior information; and
a white line judging unit that excludes, among the possible white lines recognized by the white line recognizing unit, a possible white line that satisfies a predetermined condition,
wherein the predetermined condition is either
at least one of a condition in which a possible white line is at the same position as the previous possible white line saved by the white line information saving unit and a condition in which a position of a possible white line deviates by a predetermined distance or more from the position of the possible white line to be reached that is predicted by the white line position predicting unit, or
a condition in which a change in inclination is different from a change in inclination predicted with movement of the vehicle.

* * * * *